United States Patent [19]

Sine

[11] Patent Number: 4,845,683
[45] Date of Patent: Jul. 4, 1989

[54] CABLE WIPER

[75] Inventor: George M. Sine, Los Angeles, Calif.

[73] Assignee: Allied Corporation, Morris Township, Morris County, N.J.

[21] Appl. No.: 919,355

[22] Filed: Oct. 16, 1986

[51] Int. Cl.$^4$ ............................ G01S 3/80; B63B 21/56
[52] U.S. Cl. ...................................... 367/106; 367/130; 15/256.5; 114/244; 114/254; 242/54 R
[58] Field of Search ........................ 367/106, 130, 131; 114/243, 254; 242/54 R; 134/15, 12; 15/104.4, 88, 256.5, 256.6; 254/392

[56] References Cited

U.S. PATENT DOCUMENTS

| | | | |
|---|---|---|---|
| 2,239,159 | 4/1941 | Miller | 15/256.6 |
| 2,255,154 | 9/1941 | Esposito | 15/256.6 |
| 2,821,730 | 2/1958 | Shellman | 15/256.6 |
| 3,527,611 | 9/1970 | Newfarmer | 15/104.04 |
| 4,132,973 | 1/1979 | Orme | 367/131 |
| 4,290,123 | 9/1981 | Pickens | 367/130 X |
| 4,503,577 | 3/1985 | Fowler | 15/104.4 X |

Primary Examiner—Thomas H. Tarcza
Assistant Examiner—Tod R. Swann
Attorney, Agent, or Firm—Robert C. Smith

[57] ABSTRACT

A cable wiper assembly for airborne sonar includes a housing suspended from a hoist used to rapidly raise and lower a sonar transducer at the end of a cable. The wiper assembly is interposed ahead of the cable-directing sheaves forming part of the hoist to strip away the sea water which adheres to the cable as it is pulled from the ocean. The cable wiper housing includes a series of internal grooves each of which contains and secures one wiper stage. Each stage includes a washer-like wiper of elastomeric material whose internal diameter is just slightly smaller than the cable diameter carried in a shallow cup-shaped holder having an internal port significantly larger than the cable diameter and secured by means of an upper washer-member overlying the wiper whose internal diameter is slightly larger than the diameter of the cable. The outside diameter of the wiper is somewhat less than the diameter of the internal chamber of the cup-shaped member to permit some lateral movement of the wiper within the assembly to permit the wiper to follow some lateral movement of the cable. Additional internal grooves in the housing above and below the wiper stages secure metal cable guides which minimize the magnitude of the cable lateral movement through the wipers. The housing includes radial ports spaced between the stages for discharging water away from the wiper stages.

1 Claim, 2 Drawing Sheets

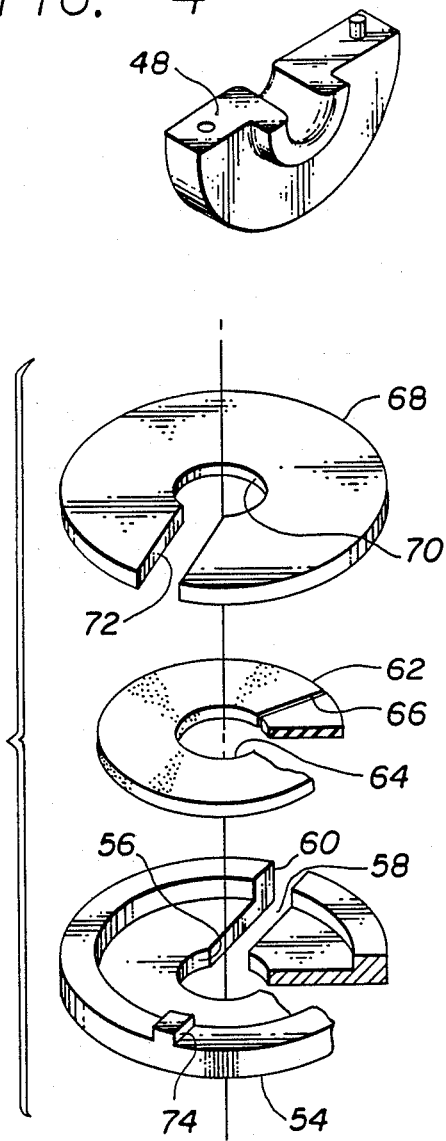
FIG. 4
FIG. 2
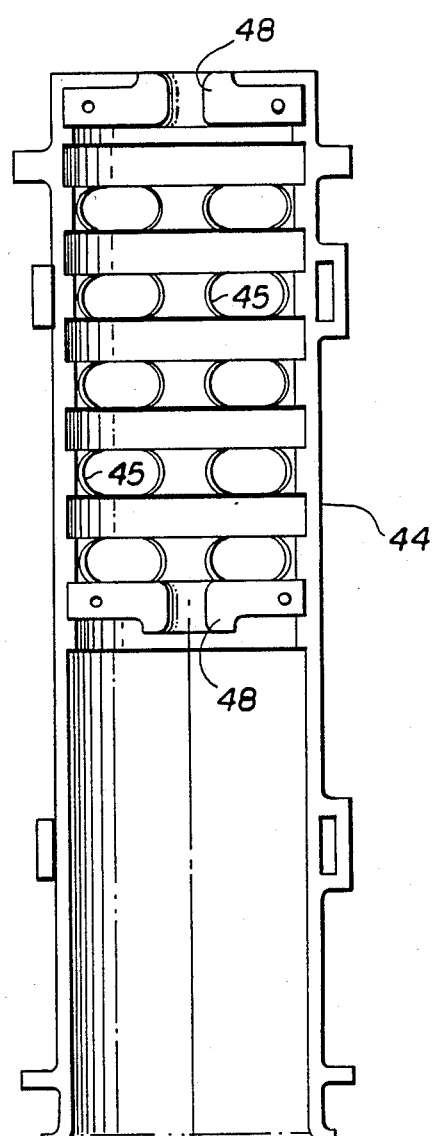
FIG. 3

CABLE WIPER

BACKGROUND OF THE INVENTION

Airborne sonar systems include a hoist mechanism carried in a helicopter, a storage drum, and drive means therefore which operate to lower a sonar transducer into the water and raise it out of the water. When raised, the transducer is carried snugly against a conical seat which prevents it from swinging or moving during flight. Although the hoist mechanism is operated at limited speeds, there are problems connected with various aspects of the retrieval. One such problem is that the cable tends to carry a substantial amount of sea water with it as it is reeled in. Since the hoist is within the helicopter and since the water tends to be sprayed all around as the cable passes over the guide sheaves, it has been found necessary to provide a cable wiper to prevent excessive amounts of water from being carried on board the helicopter.

With the advent of later types of airborne sonar, transducer operating depths have become much greater, and cable speeds upon deployment and retrieval have also become much greater. While the cables themselves are smaller in diameter, the greater speed results in their carrying even greater quantities of water, at least on a per-unit-of-time basis. With the greater reeling speed and the quantity of water carried it was found that, in the absence of a cable wiper, the spray of sea water as the cable made contact with the guide sheave was intolerably heavy.

A cable wiper design was developed a number of years ago which became the subject of a U.S. Pat. No. 4,132,973, to Myrl E. Orme, common assignee. This design was quite effective in stripping the water away from the cable and keeping it out of the helicopter. In use, however, it was determined that swinging of the transducer in air during retrieval was imposing severe side loading on the wipers, wearing out the wipers in a relatively short time, necessitating frequent replacement. Also, certain parts of the wiper assembly were quite expensive to fabricate. There is, therefore, a need for a cable wiper which is as effective in removing water from the cable as the earlier design, but which has appreciably longer wiper life and which is somewhat less expensive to produce.

SUMMARY OF THE INVENTION

Applicant has found that the excessive wear experienced in use of the earlier cable wiper was largely attributable to lateral movement of the cable caused by swinging of the transducer after it came out of the water. The wear was made even worse because the wipers themselves were so firmly secured in their housing as to preclude their having any lateral movement whatever, hence, the wipers could not move or "give" significantly with lateral movement of the cable. Applicant has designed a new wiper assembly incorporating cable guides at the top and bottom of the wipers to severely limit the magnitude of the lateral movement of the cable passing through the wipers. Each individual wiper is now carried and supported in a simple and inexpensive holder which permits a small amount of lateral movement of the wiper itself to accommodate small amounts of lateral movement of the cable which may remain after the cable passes through cable guides.

DESCRIPTION OF THE DRAWINGS

FIG. 2 is an exploded view, partly in section, of a single wiper and holder assembly;

FIG. 3 is a side view of one half of the wiper assembly housing; and

FIG. 4 is a perspective view of one half of the cable guides forming part of my invention.

DESCRIPTION OF THE PREFERRED EMBODIMENT

Figure 1:
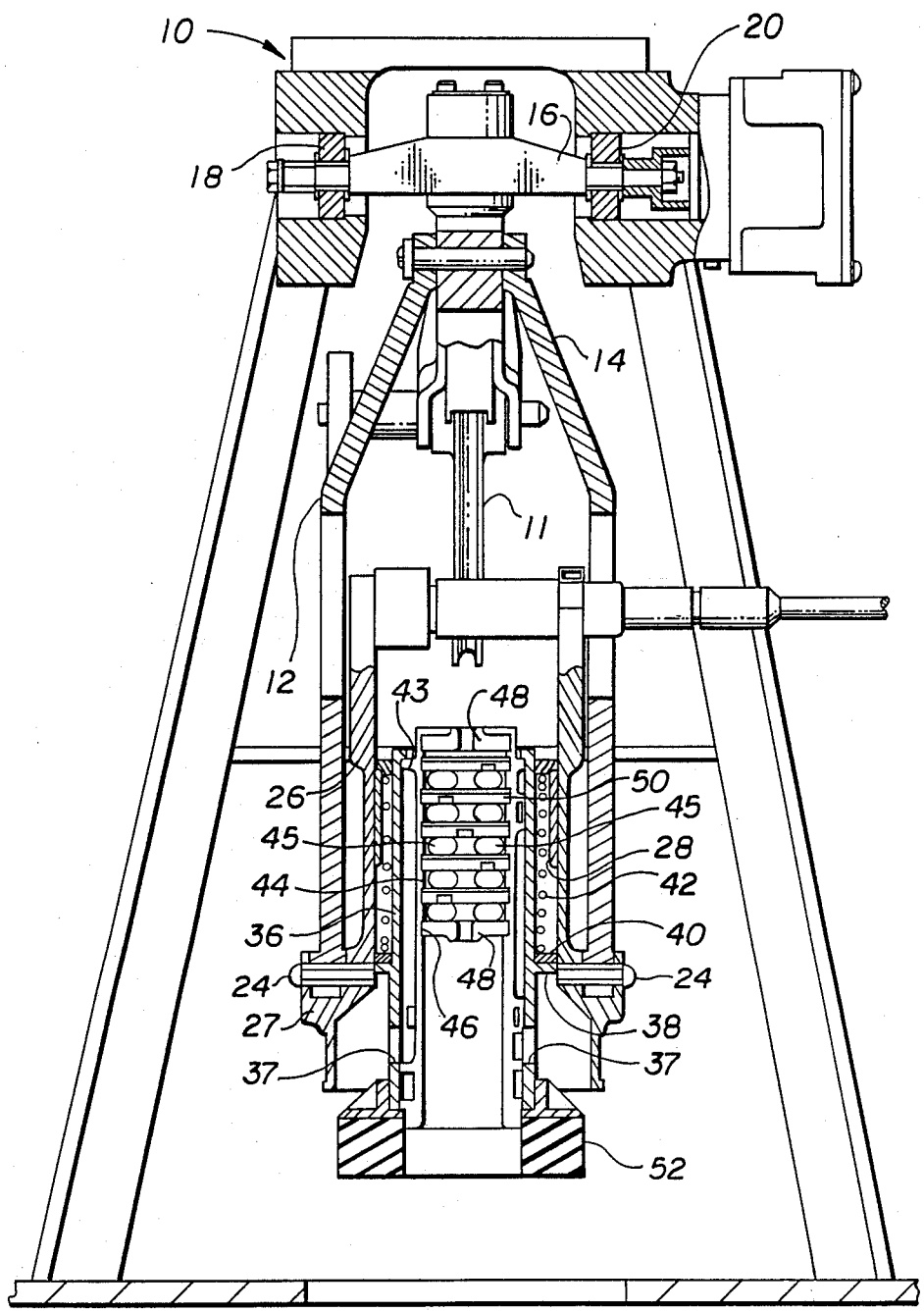
FIG. 1 is a sectional view of my cable wiper assembly including certain associated structure.

Referring now to FIG. 1, a partial view of a hoist frame 10 is shown, which frame is carried on the floor of a helicopter. Carried near the top of frame 10 is a sheave 11 which is mounted to swivel in three dimensions. A pair of support members 12, 14 are carried by a cross member 16 pivotably suspended in bearings 18, 20 supported in frame 10. The cable wiper assembly 26 is, in turn, pivotally supported on members 12, 14 by means of bolts 24 which pass through a generally cylindrical pivot member 27 of the cable wiper assembly 26 and support members 12 and 14. Carried inside of pivot member 27 and fastened thereto is a cylindrical spring retainer 28 which cooperates with a sleeve 36 including ports 37 and a flange 38 which holds a retainer 40 for spring 42. Within sleeve 36 is a generally cylindrical cable wiper housing 44. Sleeve 36 includes an internally directed flange which retains a flange 43 and prevents housing 44 from moving upwardly relative to sleeve 36. Housing 44 includes a number of radial drain ports 45 and a series of axially arranged internal grooves 46. The top and bottom grooves 46 each carry an annular cable guide 48 preferably of aluminum or other suitable heat conducting material which has a smoothly contoured internal diameter through which the cable (not shown) passes as it moves through the cable wiper assembly toward or away from the sheave 11. The intervening grooves 46 each retain a single wiper stage 50 whose structure is discussed in detail below in connection with FIG. 2.

Spring 42 is held under compression and functions to absorb the shock when a transducer strikes a rubber bumper 52 which is part of a funnel structure (not shown) against which the transducer is held while being transported. Bumper 52 and the associated funnel are threadedly engaged with the lower end of sleeve member 36 such that force striking the bumper is carried through sleeve 36 to its flange 38 and retainer 40 to compress spring 42.

FIG. 2 is an exploded view, partly in section, of a single wiper stage 50. Each stage includes a cup-shaped member 54 which includes a central hole 56 which hole is slightly larger than the cable which passes through it. A slot 58 extends from the central hole 56 to the periphery of the member 54, thus providing a means for sliding member 54 on to the cable. Member 54 includes an upstanding ridge 60 which forms a recess into which the wiper member 62 is placed. Wiper 62, which is of slightly smaller diameter than the internal diameter of ridge 60, is in the form of a washer of rubber or other suitable elastomer and includes a central aperture 64 of slightly smaller diameter than the cable which passes through it, and a radial cut 66 which makes it possible to slip the wiper over the cable. Overlying the cup-shaped member 54 and the wiper 62 is a flat washer-like cap 68 having a central opening 70 whose diameter is somewhat larger than that of the cable and a slot or keyway 72 extending to its outside edge and which makes it possible for cap 68 to slip over the cable. It will be observed that slot 72 is radially oriented with an upstanding bump or key 74 forming part of member 54 such that when members 54, 62 and 68 are assembled as a wiper stage 50 when carried in housing 44, key 74 is positioned in slot or keyway 72 thus preventing relative radial movement of cup-shaped member 54 and cap 68. This arrangement effectively locks the wiper assembly 50 around the cable so that the cable cannot slip out when the assemblies 50 are in their operative position in grooves 46 of housing 44.

The configuration of the housing 44 may be made somewhat more clear from consideration of FIG. 3. This figure shows one-half of the housing 44 which is formed of two substantially identical halves which are fastened or "snapped" together when all of the wiper assemblies 50 and the annular cable guides 48 are installed in one housing half. Each housing half includes several drain ports 45 and one half of a cable guide 48 in each of its top and bottom grooves 46. Cable guides 48 each include an indexing pin and socket on each half to assure proper alignment of the halves as shown in FIG. 4 when the halves of housing 44 are snapped together.

In operation, the cable, as it is being retrieved from the water, is pulled by the hoist up through the wiper assembly 26, over the sheave 11 and is stored on a drum, not shown, forming part of the hoist. The cable will be carrying a layer of water on its surface, and may be swinging laterally to a considerable degree. The lower cable guide 48 serves to cause the cable wiper to swing also, to follow somewhat the movement of the cable thereby limiting the lateral movement of the cable relative to the wipers. During further upward movement of the cable, the wipers 62 act to strip water from the cable which then drains through drain ports 45, flowing down along the outside of housing 44 and out through ports 37 in sleeve 36.

The cable wiper structure described constitutes a significant improvement over that described in the Orme patent referred to above in that substantially better wiper life is afforded by including the cable guides 48 at the top and bottom of the housing which causes the wiper assembly to follow the cable which substantially reduces lateral movement of cable as it passes through the wiper assembly. Wiper life is also enhanced by permitting a limited amount of lateral movement of the wiper member within the wiper stages 50. Another benefit from applicant's cable wiper is that the parts making up the cable wiper housing and individual wiper stages are simpler and significantly less expensive to fabricate.

I claim:

1. A cable wiper assembly for a sonar system in which a transducer is operated at substantial depths including a cable connected to said transducer and a hoist, said cable wiper assembly being pivotally suspended from said hoist such that said cable is drawn through said cable wiper assembly said cable wiper assembly comprising a generally cylindrical support member including a spring retainer, a sleeve member carried within said support member including a radially extending flange movable on the interior sidewall of said support member and ports extending through its sidewall, a spring retainer and a spring carried on said flange between said retainers;

a generally cylindrical wiper housing in said sleeve member having a sidewall spaced from said sleeve member, said housing including a plurality of parallel axially arranged grooves on its inner surface and a plurality of drain ports between said grooves, a disk-like cable guide positioned in each of the top and bottom said grooves, each said cable guide including a smoothly finished central port through which said cable is directed, the remaining grooves each containing a single cable wiper stage, each said stage including a cup-shaped member having a central opening, a first radial slot extending from said opening to the periphery of said member, a peripheral ridge and an upstanding projection on said ridge radially displaced from said radial slot, a washer-shaped wiper member of elastomeric material whose diameter is slightly less than the internal diameter of said ridge having a central opening slightly smaller than the diameter of said cable and a radial cut from said opening to the outside edge of said wiper, and a washer-like cap member overlying said wiper and said ridge, said cap member having a central opening and a second radial slot oriented to receive said upstanding projection to thereby prevent radial alignment of said first and second radial slots.

* * * * *